United States Patent
Viinikanoja

(10) Patent No.: US 7,528,354 B2
(45) Date of Patent: May 5, 2009

(54) METHOD AND DEVICE FOR POSITION SENSING OF AN OPTICAL COMPONENT IN AN IMAGING SYSTEM

(75) Inventor: Jarkko Viinikanoja, Tampere (FI)

(73) Assignee: Nokia Corporation, Espoo (FI)

(*) Notice: Subject to any disclaimer, the term of this patent is extended or adjusted under 35 U.S.C. 154(b) by 526 days.

(21) Appl. No.: 11/447,421

(22) Filed: Jun. 5, 2006

(65) Prior Publication Data

US 2007/0279610 A1     Dec. 6, 2007

(51) Int. Cl.
  *G02B 27/40* (2006.01)
  *G02B 27/64* (2006.01)
(52) U.S. Cl. .............. 250/201.2; 250/216; 250/201.4; 250/201.8; 359/383
(58) Field of Classification Search ............ 250/216, 250/201.2, 201.3, 201.4, 201.5, 201.6, 201.7, 250/201.8; 359/368, 383, 391, 393, 396, 359/397, 398
See application file for complete search history.

(56) References Cited

U.S. PATENT DOCUMENTS 4,641,020 A * 2/1987 Iwai .................. 250/201.5

FOREIGN PATENT DOCUMENTS

| JP | 2006276243 | 10/2006 |
| WO | WO2005/091067 | 9/2005 |

* cited by examiner

*Primary Examiner*—Thanh X Luu
*Assistant Examiner*—Tony Ko
(74) *Attorney, Agent, or Firm*—Ware, Fressola Van Der Sluys & Adolphson, LLP

(57) ABSTRACT

A light beam is used to illuminate a spot on a lens element which is shifted along the optical axis of an imaging system for auto-focus or optical zoom purposes. The light beam is arranged such that the reflected light beam from the lens element encounters a spot on the image sensor. The spot location on the image sensor is determined by a signal processor. As the lens element is shifted along the optical axis, the spot location changes accordingly. Based on the moving distance of the spot, the signal processor determines the shifting distance of the lens element and hence the position of the lens element. Based on the shifting distance of the lens element, a control module is used to adjust the lens position along the optical axis to achieve the desired focusing or zooming effects.

15 Claims, 6 Drawing Sheets

METHOD AND DEVICE FOR POSITION SENSING OF AN OPTICAL COMPONENT IN AN IMAGING SYSTEM

FIELD OF THE INVENTION

The present invention relates generally to optical position sensing in an imaging system and, more particularly, to position sensing for auto-focus optics and/or an optical zoom module in the imaging system.

BACKGROUND OF THE INVENTION

Auto-focus optical systems require high precision in position sensing. In general, needed accuracy is in the order to a few microns. Sensor output linearity and immunity to external disturbances is important. Furthermore, the operation mode for position sensing also requires non-contact operation to avoid mechanical wear. When considering optics for use in a small electronic device, such as mobile phone, the size and cost of the optical sensing components and the suitability to mass production are important issues.

Typically, position determination in a commercial auto-focus module is carried out by counting stepper motor steps. For that purpose, the motor can have an embedded position encoder. In order to reduce the size of the optical modules, miniature piezoelectric motors or actuators are generally used. These motors and actuators require a separate position sensor.

In fulfilling the need for an auto-focus optical system or an optical zoom system with movement in the order of a few microns, the present invention provides a simple method and device for position sensing.

SUMMARY OF THE INVENTION

The present invention uses a light beam to illuminate a spot on a lens element which is shifted along the optical axis of the imaging system for auto-focus or optical zoom purposes. The light beam is arranged such that the reflected light beam from the lens element encounters a spot on the image sensor. The spot on the image sensor is read out in a signal processor. As the lens element is shifted along the optical axis, the spot on the image sensor is moved accordingly. Based on the moving distance of the spot on the image sensor, the signal processor determines the shifting distance of the lens element and hence the position of the lens element. Based on the shifting distance of the lens element, a control module is used to adjust the lens position along the optical axis to achieve the desired focusing or zooming effects. The control module also controls the driving of the light beam such that the light beam is turned on only between image frames for lens position sensing.

It is possible that the light spot on the image sensor is distorted due to reflection and that the shape of the light spot on the image sensor changes considerably due to lens shifting. It may be desirable to carry out a calibration procedure to compare the actual lens shifting distance with that determined by the signal processor based on the shifting of the light spot. Furthermore, the light spot can be provided with a pulsed light source which is synchronized with frame capture such that information on the lens position can be acquired between frames. Moreover, when the data from the image sensor is transferred in order to determine the lens shifting, it is possible to transfer the image data from only a part of the image sensor where the light spot is expected to be located.

The present invention will become apparent upon reading the description taken in conjunction with FIGS. 2 to 6.

DETAILED DESCRIPTION OF THE INVENTION

Figure 1:
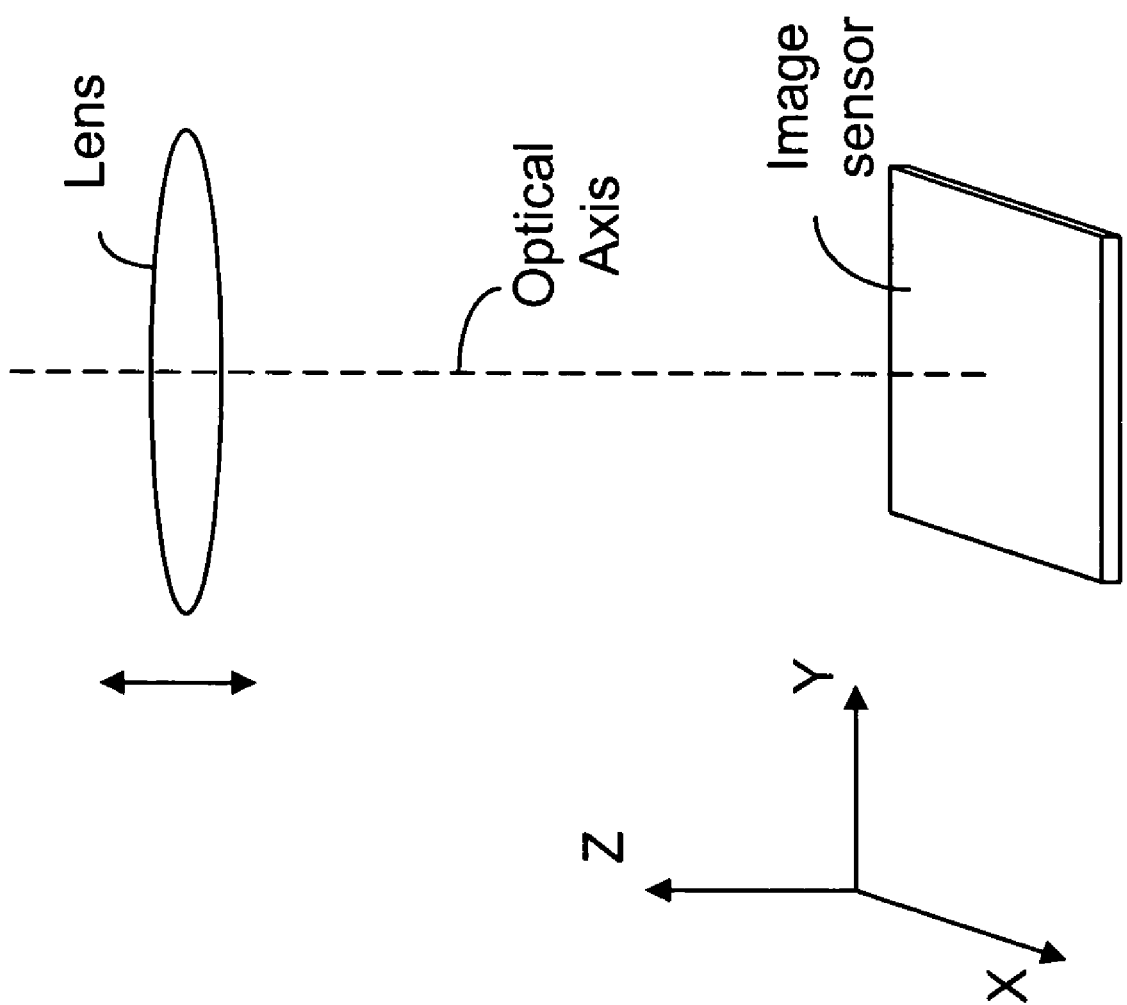
FIG. 1 is a schematic representation of an imaging system wherein one or more lens elements are moved relative to the image sensor along the optical axis for focusing or zooming purposes.

Imaging applications such as auto-focus lens systems and optical zoom systems require high precision in position sensing. In such applications, at least one lens element is moved along the optical axis of the imaging system so as to change the focal plane of the lens or the magnification of the image formed on an image sensor. As shown in FIG. 1, the movement of the lens element is substantially along the optical axis which is parallel to the Z axis. The image sensor is located in an image plane which is substantially parallel to the XY plane. The imaging system may have one or more stationary lens elements as depicted in dotted lines.

Figure 2:
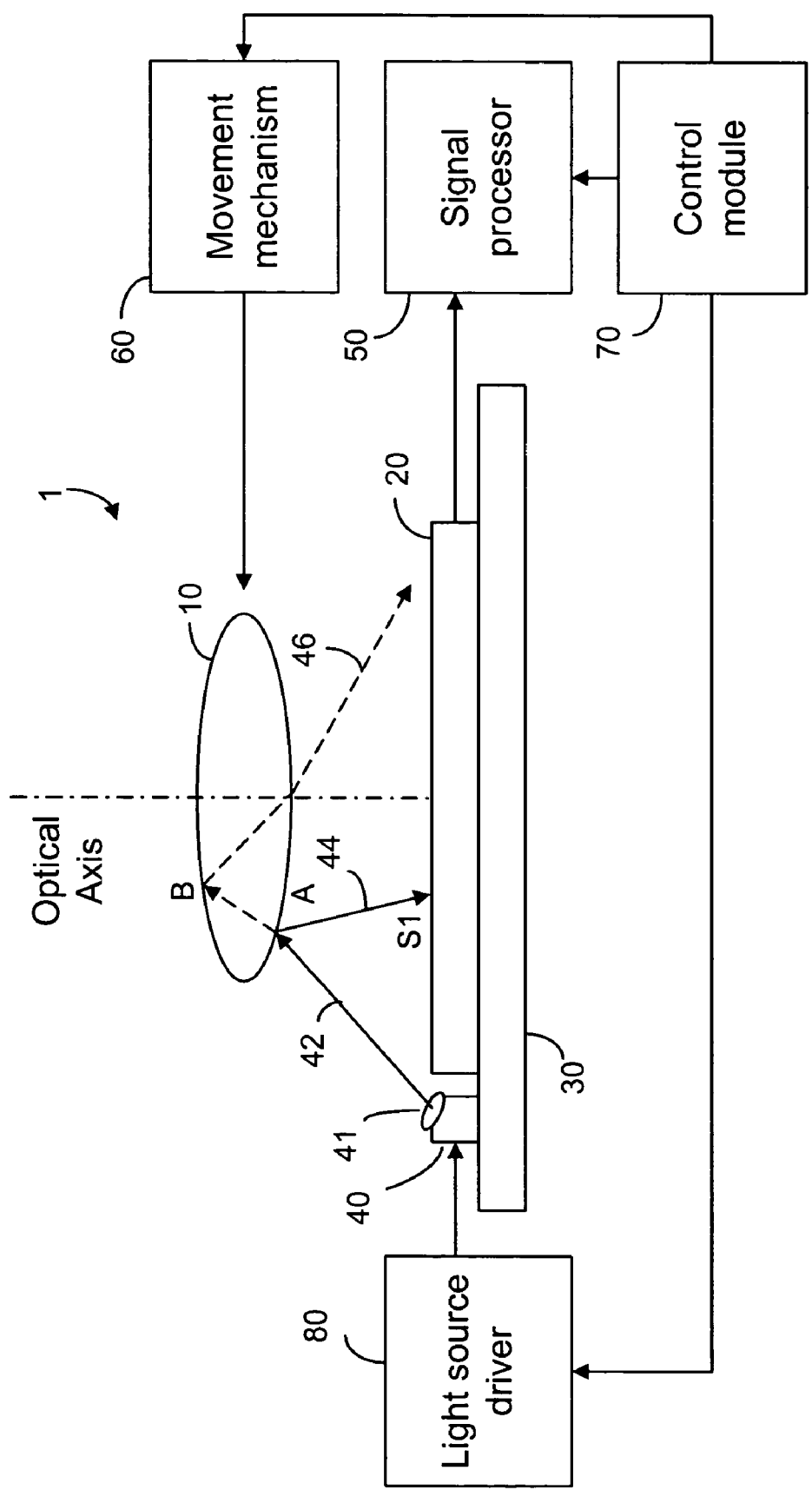
FIG. 2 is a schematic representation of an optical position sensing arrangement, according to one embodiment of the present invention.

In auto-focus or optical zoom applications, it is required to determine the position of the lens element relative to a reference point or a home position. According to the present invention, a light beam is used to illuminate a spot on the surface of the lens element such that the reflected light beam from the lens surface encounters a spot on the image sensor. As shown in FIG. 2, the imaging system 1 has a light source 40, such as a laser or a light-emitting diode, which is used to provide a beam 42 to illuminate a spot A on a lens element 10 which is shifted along the optical axis of the imaging system for auto-focus or optical zoom purposes. The light beam is arranged such that the reflected light beam 44 from the lens element 10 encounters a spot S1 on the image sensor. The light beam 42 may also encounter another surface of the lens element 10. For example, the light beam 42 may hit another surface at a spot B and the reflected light beam 46 from the spot B may also encounter the image sensor. For position sensing purposes, it is possible to use only the spot S1 produced by the reflected beam 44.

The coordinates of the spot S1 on the image sensor 20 can be determined by a signal processor 50. As shown in FIG. 2, the image sensor 20 is disposed on a substrate 30, and the light source 40 is also disposed on the substrate 30 near the image sensor 20. As shown, the imaging system 1 also comprises a movement mechanism 60 to shift the lens element 10 along the optical axis and a light source driver 80 to drive the light source 40. A control module 70 is used to control the position of lens element 10 through the movement mechanism 60, based on the reading of the spot location on the image sensor. The control module 70 also controls the on/off time of the light source 40 through the light source driver 80. For example, if optical zooming is carried out while a series of image frames are acquired, the light source 40 is turned on only during the time period between two consecutive image frames, and position of the light spot on the image sensor is read out by the signal processor 50 accordingly.

Figure 3:
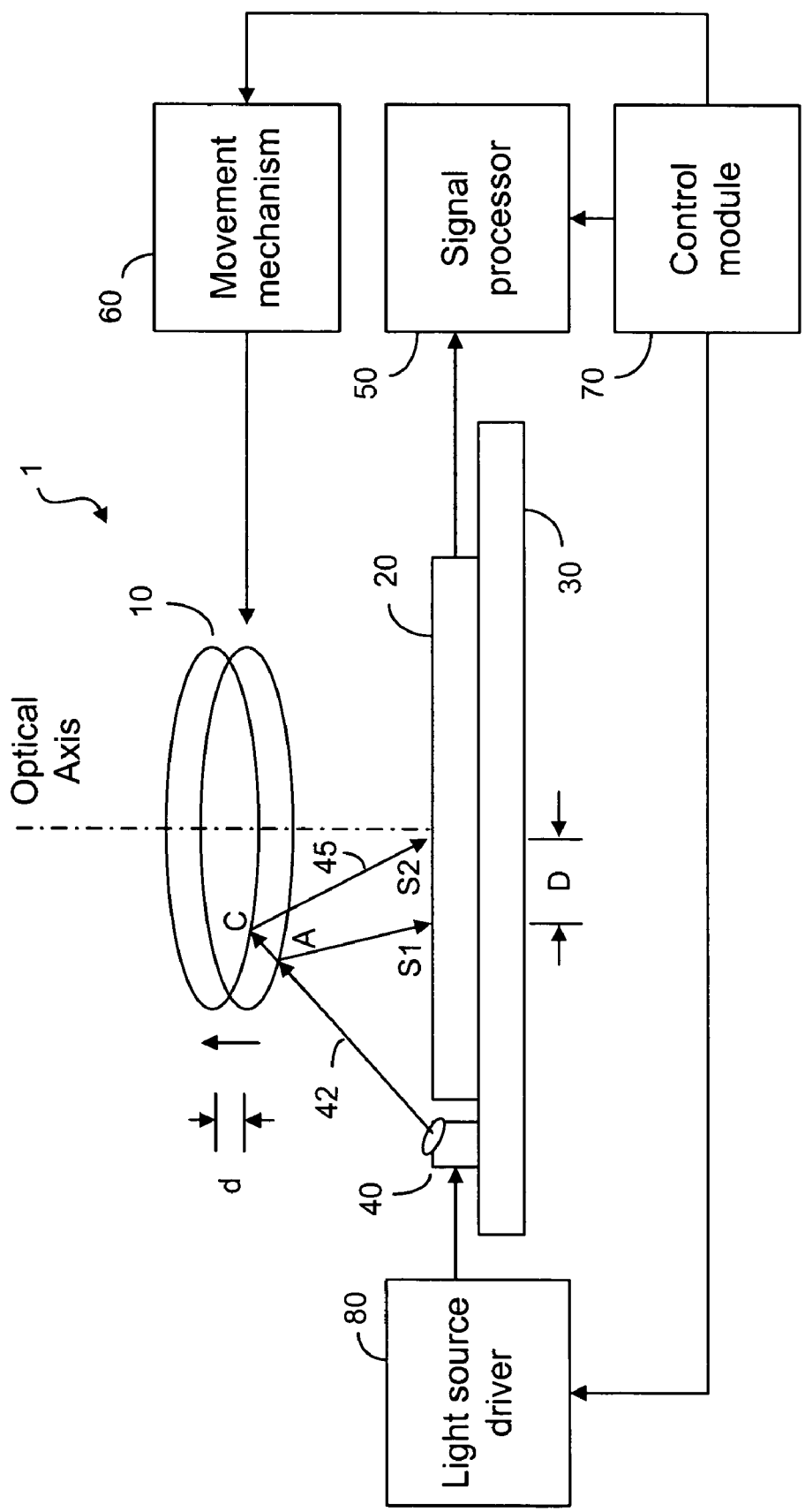
FIG. 3 shows the movement of a reflected light spot of the image sensor due to the shifting of the lens element.

When the lens element 10 is shifted along the optical axis in a direction away from the image sensor 20, the light beam 42 hits a new spot C on the lens element and a new reflected light beam 45 occurs. The reflected light beam 45 encounters the image sensor 20 at a new spot S2, as shown in FIG. 3. Through calibration, it is possible to determine the shifting distance d of the lens element 10 based on the moving distance D of the spot on the image sensor 20.

Figure 4:
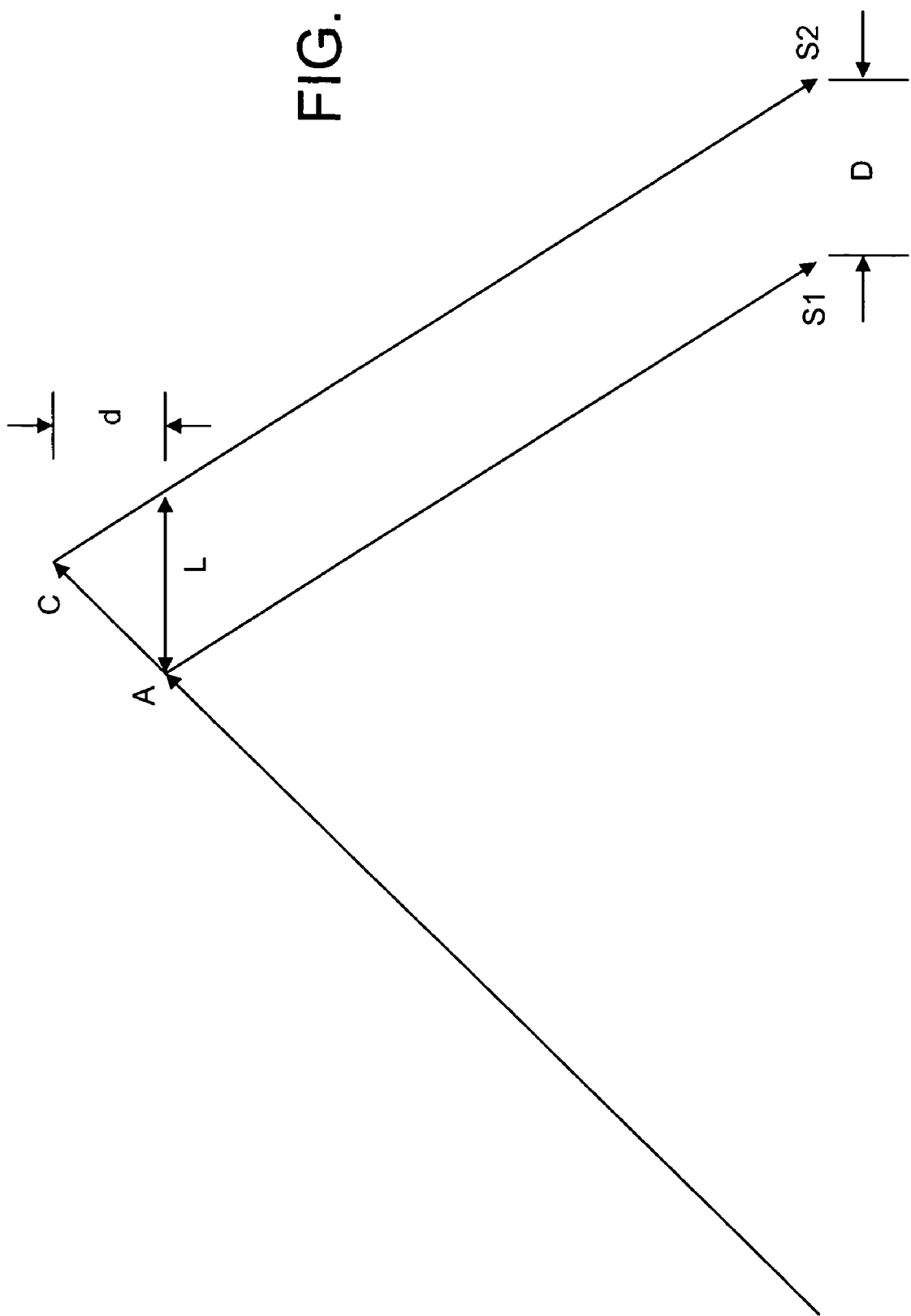
FIG. 4 shows an approximate relation between the shifting distance of the lens element and the moving distance of the spot on the image sensor.

An approximate relationship between the moving distance, D, of the light spot on the image sensor and the shifting distance, d, of the lens element is shown in FIG. 4. As shown in FIG. 4, the length L in the triangle is approximately equal to the shifting distance d. If the lens shifting distance d is small, the spot moving distance D is approximately equal to L. If the lens shifting distance is 0.5 mm, for example, then D is also in the order of 0.5 mm. With an image sensor having 2.8 μm pixel resolution, the number of pixels between S1 and S2 is approximately 178. If the mechanical movement of the lens element can be made in steps in the neighborhood of 2.8 μm and the light beam 42 is well collimated, the position of the lens element can be determined by the signal processor with the same precision. In general, a good auto-focus performance requires approximately 50 steps to shift the lens element over a distance of 0.5 mm. The present invention provides a method that can yield over 3× improvement in accuracy.

Figure 5:
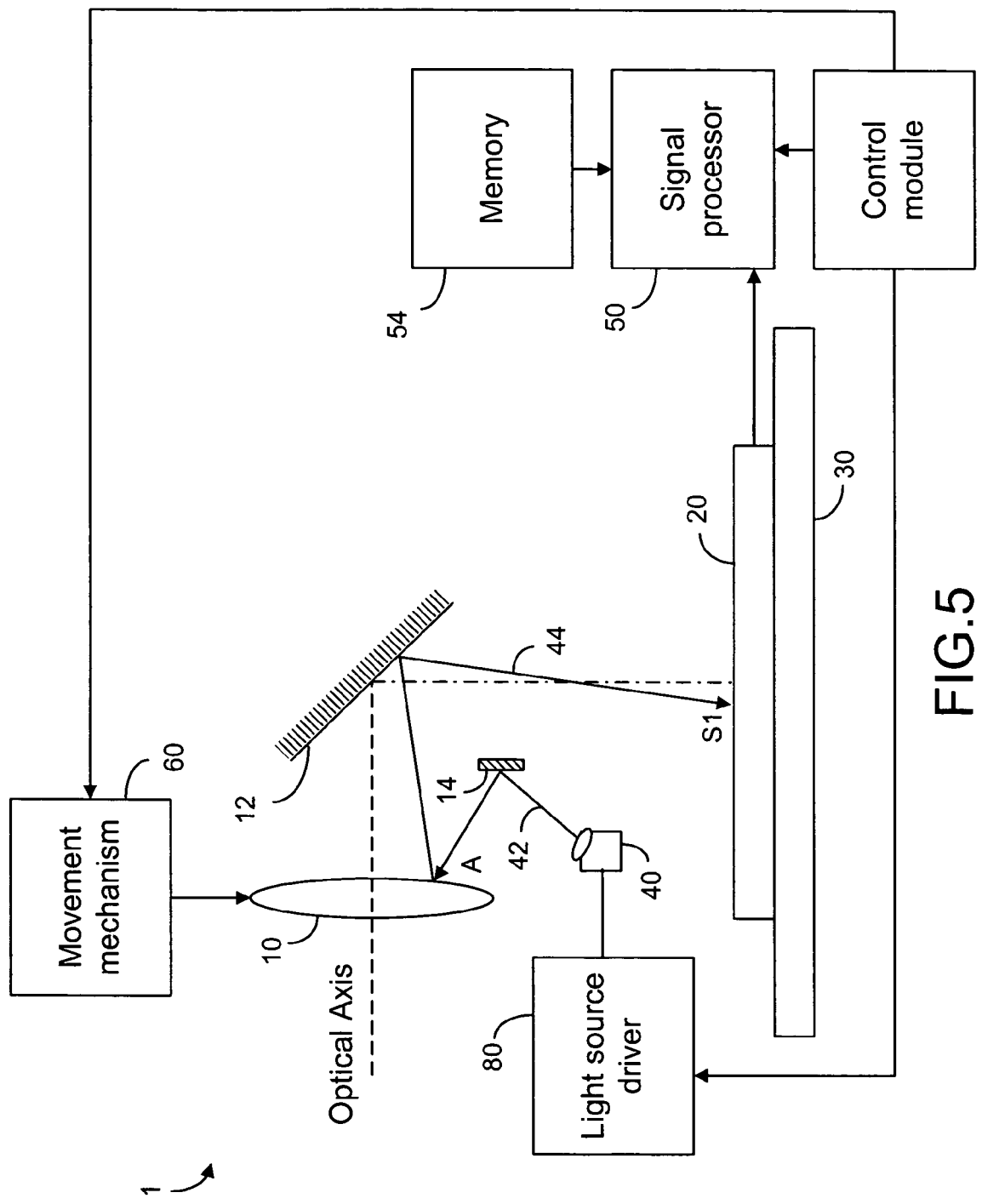
FIG. 5 shows a different optical sensing arrangement, according to one embodiment the present invention.

While it is preferable to dispose the light source 40 on the substrate 30 along with the image sensor 20, the light source 40 can be disposed at an appropriate location within the imaging system 1. For example, the light source 40 can be separated from the substrate 30, as shown in FIG. 5. Furthermore, the light beam 42 can be reflected from a surface 14 before it encounters the lens element 10 and the reflected beam 44 can be reflected from a surface 12 before it encounters the image sensor 20.

Depending on the shape of the light beam, the spot of the lens surface at which the illuminating beam 42 is reflected, and other intervening optical components, the light spot on the image sensor may be distorted. Also, the shape of the spot on the image sensor may change significantly due to the lens shifting. Thus, it may be desirable to carry out a calibration procedure in order to compare the actual lens shifting distance with that determined by the signal processor based on the shifting of the light spot on the image sensor. The calibration data can be stored in a memory device 54 as shown in FIG. 5, for example.

The light source 40 can be a single collimated light emitter or a combined system of a light source and beam shaping optics. While it is preferred that the light beam 42 is collimated, it is possible to shape the light beam such that a clear spot can be observed on the image sensor so as to allow the signal processor to determine the lens shifting distance with a desired precision.

Moreover, while it is preferable to use the reflected light beam from the first surface encountering the light beam 42, the light beams from other surfaces of the lens element can also be used. Furthermore, the light source 40 can be a pulsed light source which is synchronized with frame capture such that information on the lens position can be acquired between image frames. Also, the amount of data transferred from the image sensor 20 to the signal processor 50 can be smaller when information on the lens position is acquired than when an image frame is captured. For example, when the data from the image sensor 20 is transferred in order to determine the lens shifting, it is possible to transfer the image data from only a part of the image sensor where the light spot is expected to be located. It is also possible to skip a plurality of pixels in such data transfer.

Figure 6:
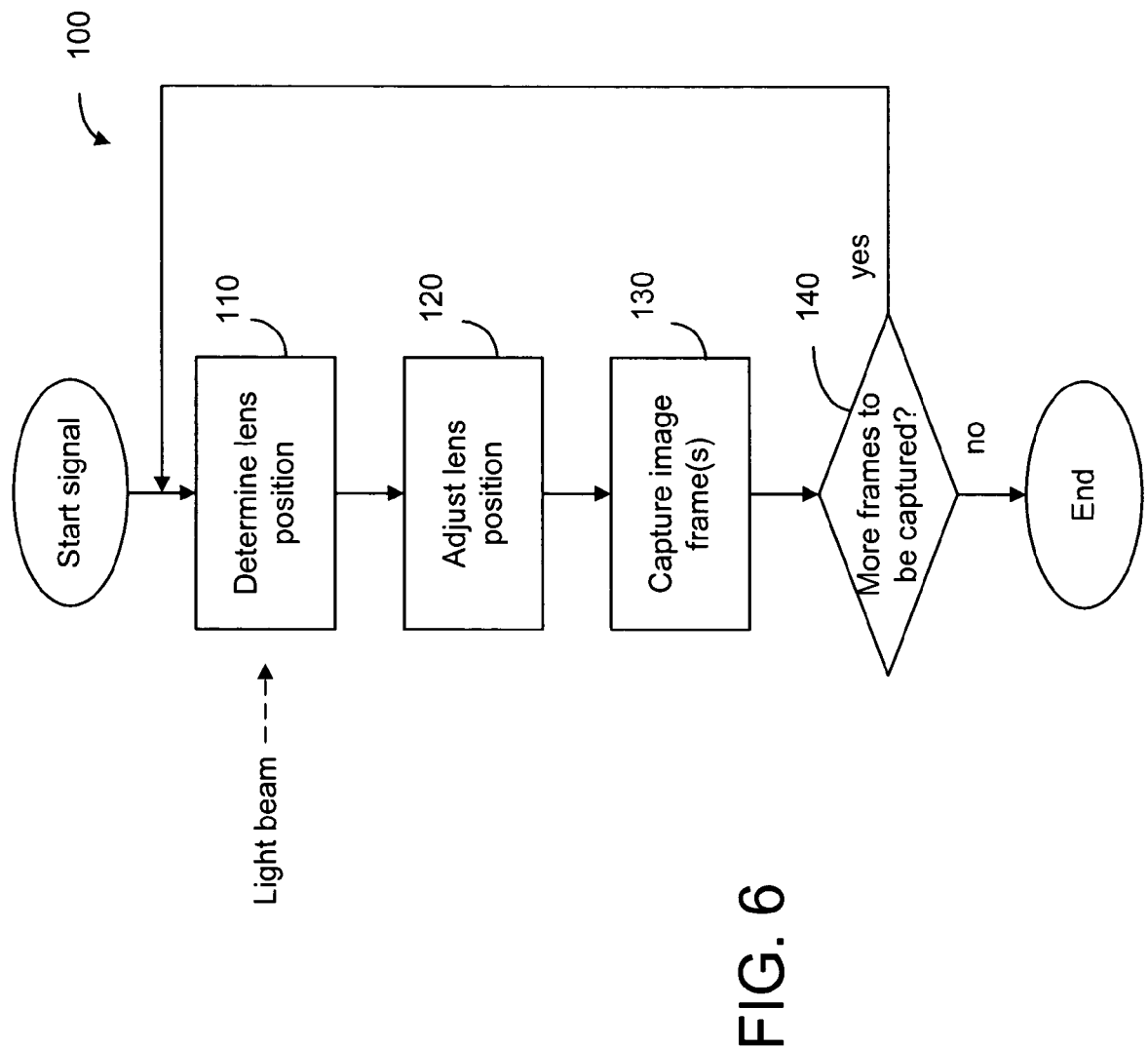
FIG. 6 is a flowchart illustrating the method of determining the position of an lens element in an image sensor, according to an embodiment of the present invention.

The position sensing, according to various embodiments of the present invention, can be illustrated in a flowchart as shown in FIG. 6. As shown in the flowchart 100, after a start signal is used to start the process of capturing one or more image frames, a light spot is provided to illuminate a lens element for achieving a reflected light spot on the image sensor and the lens position on the image sensor is determined at step 110, based on the light spot position on the image sensor. If calibration data is available, then the lens position is adjusted based on the calibration data at step 120. One or more image frames are captured at step 130. If one or more further frames to be captured, as determined at step 140, then the process loops back to step 110. Otherwise, the process is caused to end.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. An imaging system comprising:
    an image sensor located at an image plane;
    at least a lens element for projecting an image on the image sensor, the lens element defining an optical axis;
    a driving mechanism, operatively connected to the lens element, for shifting the lens element relative to the image sensor in a direction substantially parallel to the optical axis;
    a light source for providing a light beam to illuminate a spot on a surface of the lens element so as to produce a reflected light beam from the spot on said surface, wherein the light source is so positioned that the reflected light beam is arranged to encounter the image sensor at a location on the image sensor; and
    a processor, operatively connected to the image sensor, for determining the encountering location, wherein when the lens element is shifted by a shifting distance, said encountering location is moved within the image sensor by a moving distance, the processor is configured to compute the shifting distance of the lens element based on the moving distance of the encountering location.

2. The imaging system of claim 1, wherein the light source comprises a laser.

3. The imaging system of claim 1, wherein the light source comprises an light emitting element.

4. The imaging system of claim 1, wherein the processor is configured to capture image frames from the image sensor and to determine the encountered location based on data transferred from the image sensor between image frames, and wherein the light source comprises a pulsed light source in synchronism to the frame capture such that the reflected light beam is arranged to encounter the image sensor at a location on the image sensor also between image frames.

5. The imaging system of claim 4, wherein amount of the data transferred for determining the encountered location is smaller than amount of data transferred for frame capture.

6. The imaging system of claim 1, further comprising a control module, operatively connected to the driving mechanism for adjusting the lens element based on the computed shifting distance.

7. The imaging system of claim 6, further comprising a memory module for storing calibration data for said adjusting.

8. A method for position sensing, comprising:

providing a light beam in relationship to a lens element in an imaging system to illuminate a spot on a surface of the lens element so as to produce a reflected light beam from the spot on said surface, wherein the imaging system comprises an image sensor and the lens element is arranged to project an image on the image sensor along an optical axis, and the lens element is shiftable relative to the image sensor in a direction substantially parallel to the optical axis, and wherein the light beam is so positioned that the reflected light beam encounters the image sensor at a location on the image sensor, and wherein when the lens element is shifted by a shifting distance, said encountering location is moved within the image sensor by a moving distance; and determining the moving distance of said encountering location for computing the shifting distance of the lens element based on the moving distance of the encountering location.

9. The method of claim 8, further comprising:

adjusting position of the lens element based on the computed shifting distance.

10. The method of claim 9, further comprising:

adjusting the computed shifting distance based on calibration data.

11. A position sensing module for use in an imaging system, comprising:

a light source for providing a light beam to illuminate a spot on a surface of a lens element of the imaging system so as to produce a reflected light beam from the spot on said surface, wherein the imaging system comprises an image sensor at an image plane and the lens element is arranged to project an image on the image sensor along an optical axis, and the lens element is shiftable relative to the image sensor in a direction substantially parallel to the optical axis, and wherein the light source is so positioned that the reflected light beam is arranged to encounter the image sensor at a location on the image sensor; and a processor, operatively connected to the image sensor, for determining the encountering location, wherein when the lens element is shifted by a shifting distance, said encountering location is moved within the image sensor by a moving distance, the processor is configured to compute the shifting distance of the lens element based on the moving distance of the encountering location.

12. The position module of claim 11, further comprising a memory module for storing calibration data for adjusting the computed shifting distance based on the calibration data.

13. An imaging system, comprising:

means for projecting an image along an optical axis, said projecting means including a lens element having a lens surface;

means for sensing the image at an image plane;

means for shifting the lens element relative to the image sensor in a direction substantially parallel to the optical axis;

means for illuminating a spot on the lens surface so as to produce a reflected light beam from the spot on said surface such that the reflected light beam encounters the image sensing means at a location on the image sensing means; and means, configured to read out information from the image sensing means, for determining the encountering location, wherein when the lens element is shifted by a shifting distance, said encountering location is moved within the image sensing means by a moving distance, the determining means is configured to compute the shifting distance of the lens element based on the moving distance of the encountering location.

14. The imaging system of claim 13, further comprising:

means for adjusting position of the lens element based on the computed shifting distance.

15. The imaging system of claim 14, further comprising:

means for storing calibration data, wherein the position adjusting is based on the calibration data.

* * * * *